United States Patent
Hanif et al.

(10) Patent No.: US 12,450,113 B2
(45) Date of Patent: Oct. 21, 2025

(54) DETERMINING AN UNPLANNED SWAP EVENT RISK LEVEL FOR A STORAGE SYSTEM

(71) Applicant: INTERNATIONAL BUSINESS MACHINES CORPORATION, Armonk, NY (US)

(72) Inventors: Tariq Hanif, Lagrangeville, NY (US); Tabor R. Powelson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 18/498,133

(22) Filed: Oct. 31, 2023

(65) Prior Publication Data

US 2025/0138927 A1 May 1, 2025

(51) Int. Cl.
*G06F 11/00* (2006.01)
*G06F 11/07* (2006.01)

(52) U.S. Cl.
CPC ...... *G06F 11/0769* (2013.01); *G06F 11/0745* (2013.01)

(58) Field of Classification Search
CPC ............. G06F 11/0769; G06F 11/0745; G06F 11/0727; G06F 11/0754; G06F 11/2053; G06F 11/3034; G06F 11/3041
See application file for complete search history.

(56) References Cited

U.S. PATENT DOCUMENTS

| | | | |
|---|---|---|---|
| 6,081,812 A * | 6/2000 | Boggs | G06F 11/008 |
| | | | 707/999.102 |
| 6,260,068 B1 | 7/2001 | Zalewski et al. | |
| 9,229,796 B1 * | 1/2016 | Ma | G06F 11/3452 |
| 10,747,606 B1 * | 8/2020 | Shemer | G06F 11/079 |
| 10,816,954 B2 * | 10/2020 | Mita | G05B 23/0251 |
| 11,068,314 B2 | 7/2021 | Roy et al. | |
| 2008/0201540 A1 | 8/2008 | Sahita et al. | |
| 2014/0019802 A1 * | 1/2014 | Rooney | G06F 11/2092 |
| | | | 714/6.3 |
| 2017/0104815 A1 * | 4/2017 | Tao | H04L 67/1029 |
| 2018/0088844 A1 | 3/2018 | Hanif et al. | |
| 2018/0107570 A1 * | 4/2018 | Hardy | G06F 11/3433 |
| 2019/0258420 A1 | 8/2019 | Olderdissen | |
| 2020/0034224 A1 * | 1/2020 | Nagendra | G06F 11/004 |

* cited by examiner

*Primary Examiner* — Joseph D Manoskey
(74) *Attorney, Agent, or Firm* — Onyx IP Group

(57) ABSTRACT

Determining an unplanned swap event risk level for a storage system includes monitoring for input/output (I/O) errors on each of a plurality of storage devices of a first storage system within a predetermined time interval. A criticality level of the first storage system is determined. A risk level for an unplanned swap event is calculated based on detected I/O errors for each of the plurality of storage devices and the criticality level of the first storage system. The unplanned swap event includes swapping between usage of the first storage system and a second storage system by a computing system. The risk level for the unplanned swap event is provided.

20 Claims, 12 Drawing Sheets

```
              Swap Risk Display Example
                        1200 d hs, status
IOSHM0303I
Number of configurations: 1
Replication Session: REPLICATION_TESTH1H2
HyperSwap enabled
Swap Risk: High Swap Risk Detected
  SYS1: Low Swap Risk Detected
  SYS2: High Swap Risk Detected
  ...
```

DETERMINING AN UNPLANNED SWAP EVENT RISK LEVEL FOR A STORAGE SYSTEM

BACKGROUND

The present disclosure relates to methods, apparatus, and products for determining an unplanned swap event risk level for a storage system.

SUMMARY

According to embodiments of the present disclosure, various methods, apparatus and products for determining an unplanned swap event risk level for a storage system are described herein. In some aspects, determining an unplanned swap event risk level for a storage system includes monitoring for input/output (I/O) errors on each of a plurality of storage devices of a first storage system within a predetermined time interval. A criticality level of the first storage system is determined. A risk level for an unplanned swap event is calculated based on detected I/O errors for each of the plurality of storage devices and the criticality level of the first storage system. The unplanned swap event includes swapping between usage of the first storage system and a second storage system by a computing system. The risk level for the unplanned swap event is provided.

DETAILED DESCRIPTION

Figure 1:
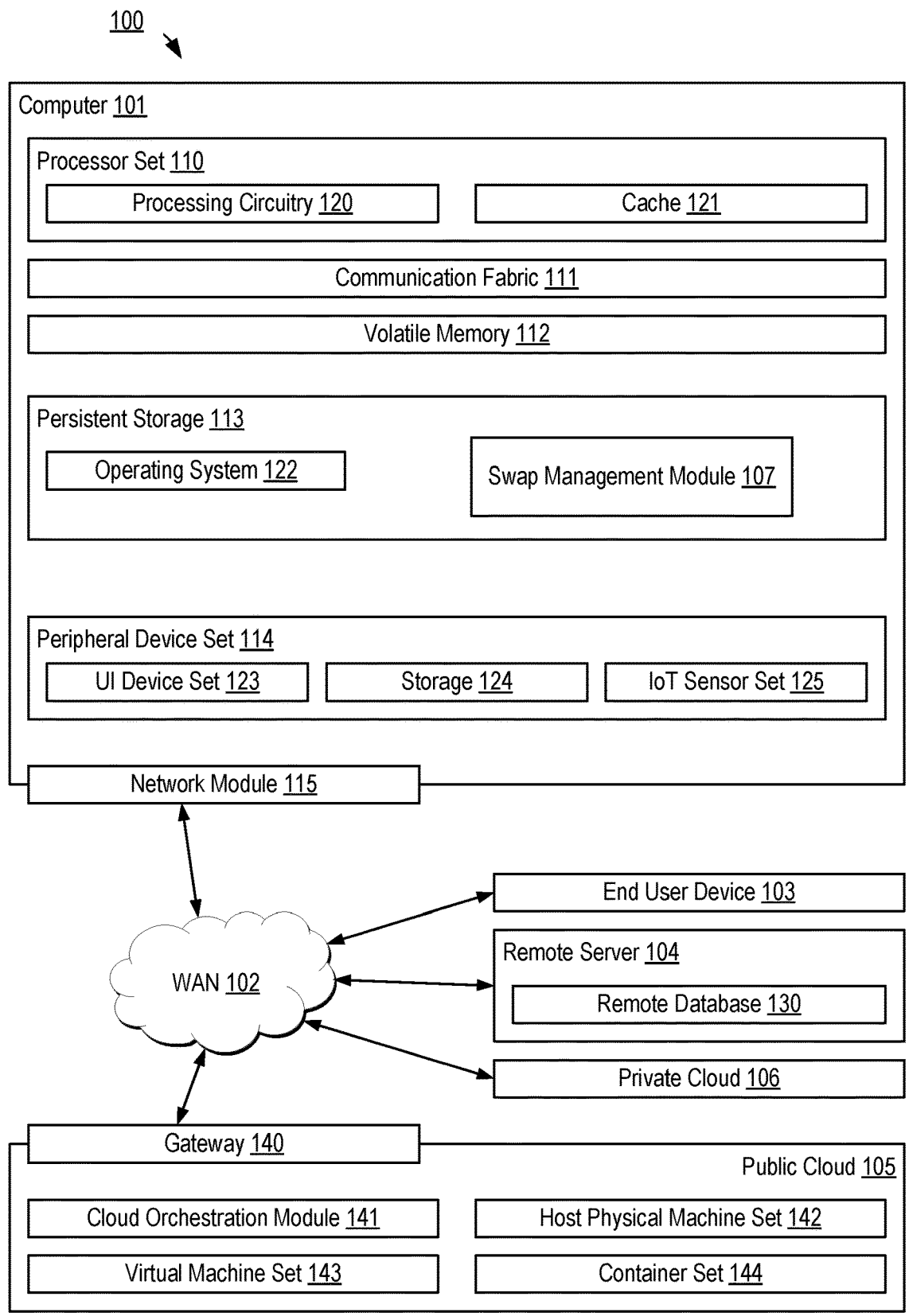
FIG. 1 sets forth an example computing environment according to aspects of the present disclosure.

A computing system is often in communication over a network with one or more storage systems for storing and accessing data used during operation of the computing system. The different storage systems are often located in different geographical locations. Each storage system typically includes one or more storage devices (e.g., disk drives) controlled by a storage controller. Storage replication allows for maintaining redundant copies of data on two different storage systems to allow for continuous availability in the event of a failure of one of the storage systems. Switching from usage of one storage system to another storage system is often referred to as a swap event. If the switching from one storage system to another storage system in the event of a failure of the storage system is often referred to as an unplanned swap event. An example of an operating system including such swap capability is the HyperSwap function provided by the z/OS operating system offered by International Business Machines™. A sysplex refers to a cluster of independent instances of the z/OS operating system. The HyperSwap function provides for continuous availability in the event of disk failures by maintaining synchronous copies of all primary disk volumes on one or more secondary storage controllers. Disk failures can be hidden from applications by the HyperSwap function automatically swapping form one set of disk volumes to another as a result of triggering a swap event.

However, there is risk and overhead associated with swap events. For example, if there is a failure on a system during the swap operation and that system cannot complete the swap operation, the system may need to be removed from a sysplex, resulting in a system outage. After the swap operation, the sysplex no longer has high availability protection against storage failures since the disk mirroring relationship was broken. If errors are only impacting non-vital volumes on a non-vital system (e.g., user datasets on a test system), it may be preferrable to not perform a swap event. "Soft" I/O errors such as interface control checks and I/O timeouts may occur for minutes or hours and impacting I/O before a "hard" failure occurs to trigger a swap event. If a swap is imminent and impacting vital volumes, it may be preferrable to swap sooner rather than later to resolve the I/O impact. In addition, users express a need to better view the overall health status of the replication environment. If a sysplex is starting to show signs that an unplanned swap may be upcoming, a user typically would like to know about the unplanned swap ahead of the time of occurrence. The user could then either take action to correct the problem, or perform a planned swap event at time of low system utilization rather than risking an unplanned swap event during a busy period.

With existing systems, users can determine an overall ability of a sysplex to perform a swap event, but are unable to determine how much risk exists that an unplanned swap event may occur. Various embodiments described herein provide for tracking unplanned swap event risk at a sysplex (or cluster) level and externalize the swap event risk to a user. In one or more embodiments, a swap risk management module keeps track of a count of I/O errors in one or more time intervals. In a particular example, the one or more time intervals include maintain a count of I/O errors in the current 5 minute interval, the past 12 five-minute internals, and the paste 24 one-hour intervals. In one or more embodiments, a swap event risk is calculated based on the number of errors and externalized when the risk changes. In particular embodiments, a command D, HS STATUS is enhanced to provide not only an overall swap status for a sysplex, but additionally display a risk of an unplanned swap event occurring. In one or more embodiments, a swap event risk includes one of: No Errors Detected, Low Swap Event Risk, Medium Swap Event Risk, and High Swap Event Risk. In still other embodiments, the swap event risk may be represented as a numerical value or a range of numerical values. When the swap risk is other than No Errors Detected, the system name(s) that has a potential issue is displayed. In some embodiments, if a trend of errors is increasing in one or more time intervals, e.g., either the five-minute intervals or one-hour intervals, an alert is raised to the user. In addition, a message representing the swap risk may be communicated to an operating system.

One or more embodiments define a new I/O error control block which is pointed to by a unit control block which represents the device to the operating system. The I/O error block contains counters of various I/O errors experienced by the device. In particular embodiments, missing interrupt handler (MIH) processing checks for any I/O requests queued for at least n seconds (e.g., 1 second), and increments an n second I/O timeout counter for the storage device. In another particular embodiment, I/O second level interrupt handler (SLIH) processing increments counters for interface control checks (IFCCs) and unit checks when they occur. An IFCC indicates that an incorrect signal has occurred on a channel path associated with the storage device. Often IFCC errors can be corrected automatically, but frequent occurrence of IFCCs may indicate a failure of the channel path leading to performance degradation due to the need for error recovery processing. In particular embodiments, a storage controller sends storage controller health messages when resources are not available or under service indicating a relative health as either moderate, severe, or acute and increments corresponding counters when moderate and severe health conditions occur.

In one or more embodiments, a swap manager component evaluates a swap score value and determines an unplanned swap risk level each time a given error occurs. In a particular embodiment, the swap score value is based on a count of vital volumes (or devices) with error counts above a first threshold value and a count of non-vital volumes (or devices) with error counts above a second threshold value, with the vital volume (or device) error counts being weighted higher than the non-vital volume (or device) error counts. In addition, in particular embodiments each storage system may be given a criticality attribute indicating either a vital or non-vital attribute designation representing whether the storage system is either vital or non-vital. In particular embodiments, the vital or non-vital attribute is input by a user upon startup to a HyperSwap API address space. In one or more embodiments, when a swap score value on a storage system having a non-vital attribute exceeds a non-vital threshold value, or a swap score value on a storage system having a vital attribute exceeds a vital threshold value, the swap manager component triggers a swap event.

In a particular embodiment, determining and presenting an unplanned storage swap risk level includes monitoring for I/O errors on multiple storage systems in a sysplex, calculating a swap risk level based on I/O errors encountered and a criticality of the affected systems, externalizing changes to the swap risk level, and externalizing the current swap risk level when requested by a user. In an embodiment, I/O errors are tracked over time and an increase in I/O error rate over time is detected, suggesting that more severe errors may occur. In an embodiment, externalizing the swap risk level can include one or more of displaying the system(s) with non-zero risk level, issuing a message to an operating system, and raising a warning alert to a replication manner associated with the swap operations.

With reference now to FIG. 1, FIG. 1 sets forth an example computing environment according to aspects of the present disclosure. Computing environment 100 contains an example of an environment for the execution of at least some of the computer code involved in performing the various methods described herein, such as swap management module 107. In addition to swap management module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and swap management module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in swap management module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in swap management module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
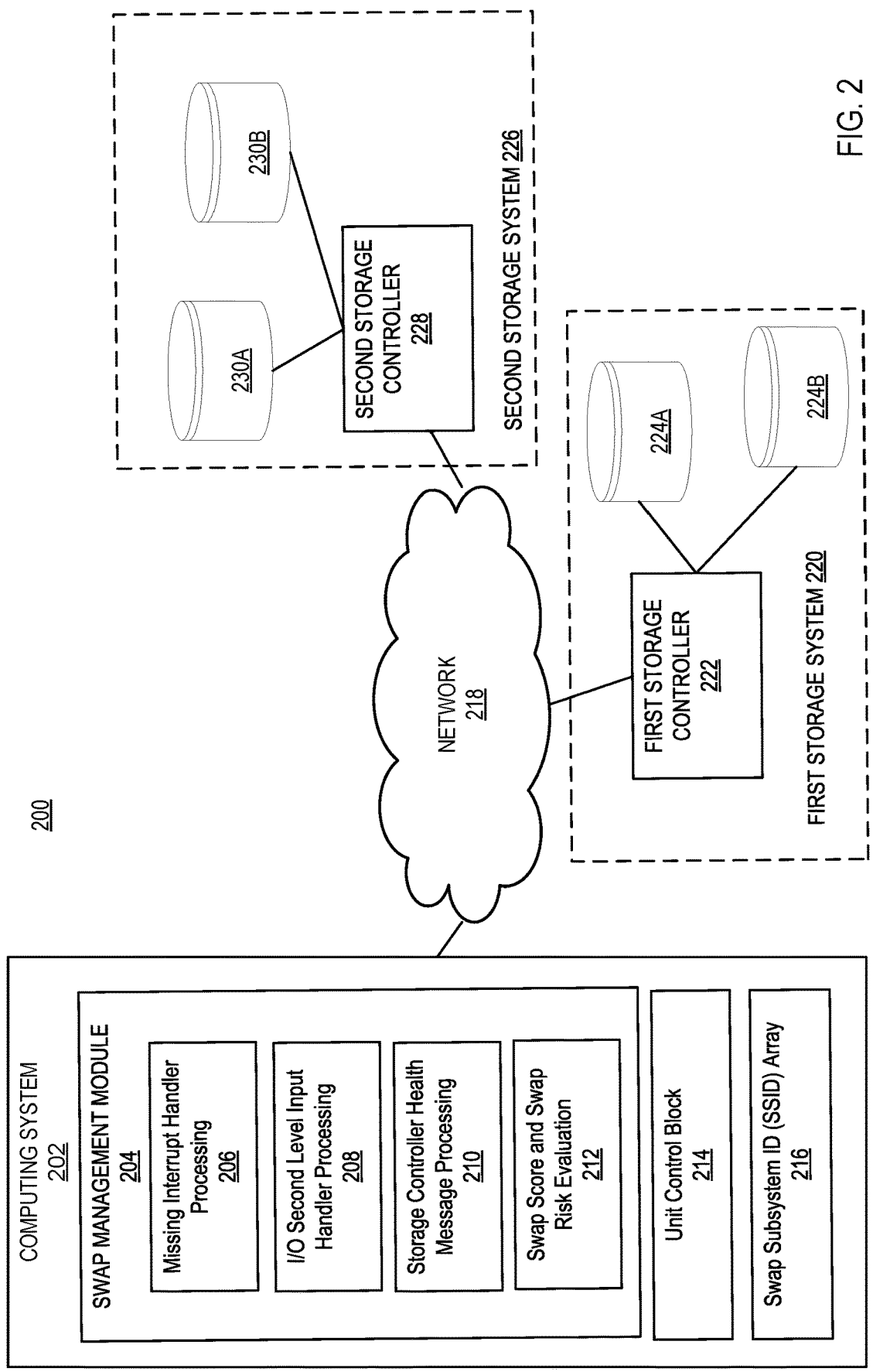
FIG. 2 sets forth another example computing environment according to aspects of the present disclosure.

Referring now to FIG. 2, FIG. 2 sets forth another example computing environment according to aspects of the present disclosure. Computing environment 200 includes a computing system 202. In a particular embodiment, the computing system 202 includes the computer 101 described with respect to FIG. 1. The computing system 202 includes an a swap management module 204 including a missing interrupt handler (MIH) processing component 206, an I/O second level input handler (SLIH) processing component 208, a storage controller health message processing component 210 and a swap score and swap risk evaluation component 212. The computing system further includes a user control block 214 and a swap subsystem identifier (SSID) array 216.

The computing system 202 is in communication with a first storage system 220 and a second storage system 226 via a network 218. The first storage system 220 includes a first storage controller in communication with a first storage device 224A and second storage device 224B. The second storage system 226 includes a second storage controller 228 in communication with a third storage device 230A and a fourth storage device 230B. The computing system 202 is configured to utilize the first storage system 220 and the second storage system 226 for storing and retrieving data associated with operations of the computing system 202. In the illustrated embodiment, the computing system utilizes the first storage system 220 as a primary storage system and the second storage system 226 as a secondary storage system until a swap event is triggered to swap usage of the computing system 202 from the first storage system 220 to the second storage system 226. The computing system 202 is configured to determine a determining an unplanned swap event risk level as further described herein with respect to various embodiments.

Figure 5:
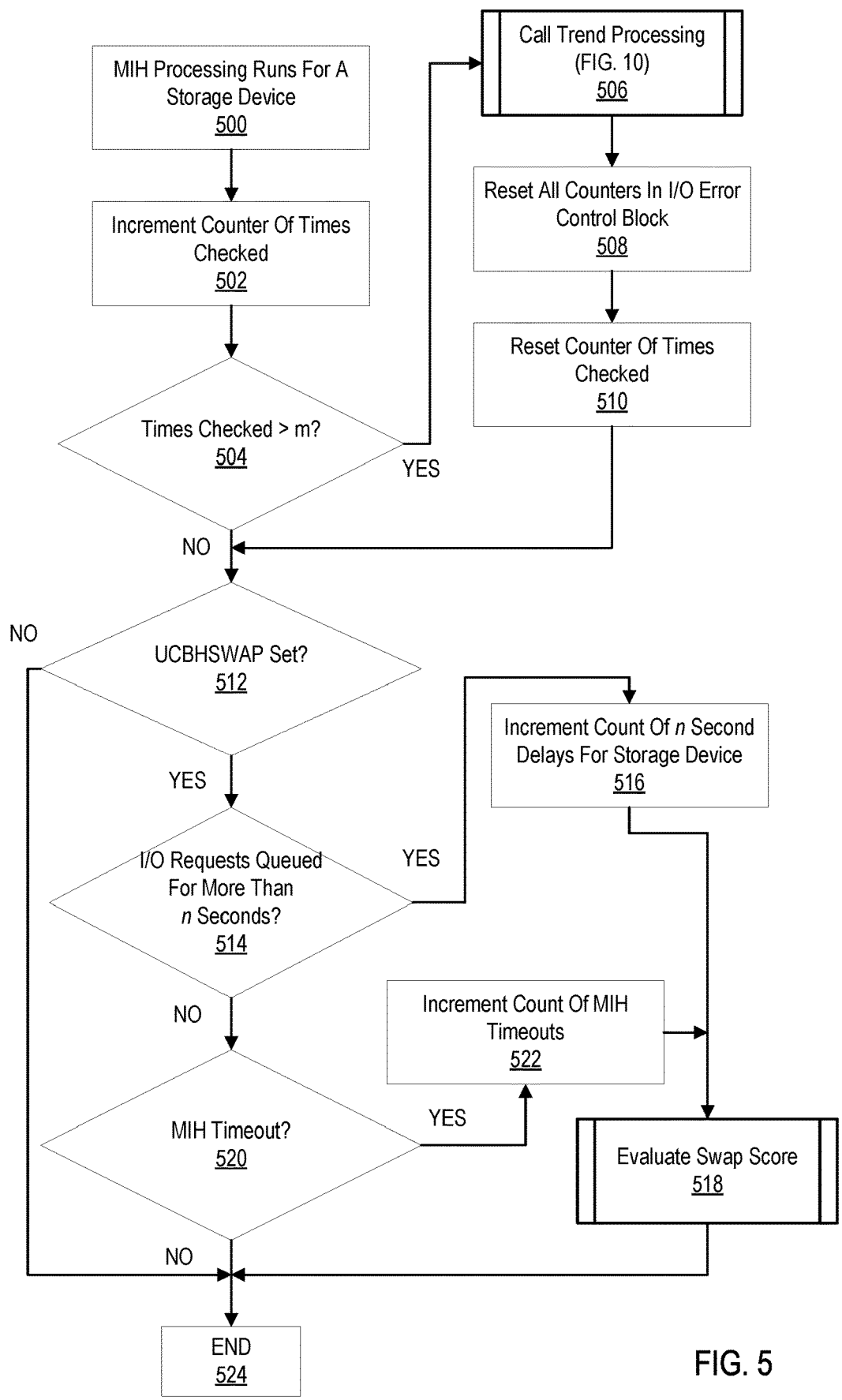
FIG. 5 sets forth a flowchart of an example process for missing interrupt handler processing according to aspects of the present disclosure.

The MIH processing component 206 is configured to check for I/O requests queued for more than a predetermined time and I/O request timeouts as further described with respect to an embodiment in FIG. 5. The I/O SLIH processing component 210 is configured to increment counters for IFCCs and unit checks when they occur as further described with respect to an embodiment in FIG. 6. Storage controller health message processing component 210 is configured to receive storage controller health messages from the first storage controller 222 indicative of a health (e.g., moderate, severe, acute) of the first storage system 220 and increment individual counters for moderate device errors and severe errors as further described with respect to an embodiment in FIG. 7. The swap score and swap risk evaluation component 212 is configured to evaluate a swap score for the first storage system 220 to determine whether to trigger a swap event from the first storage system 220 to the second storage system 226 as further described with respect to an embodiment in FIGS. 8A-8B.

Figure 3:
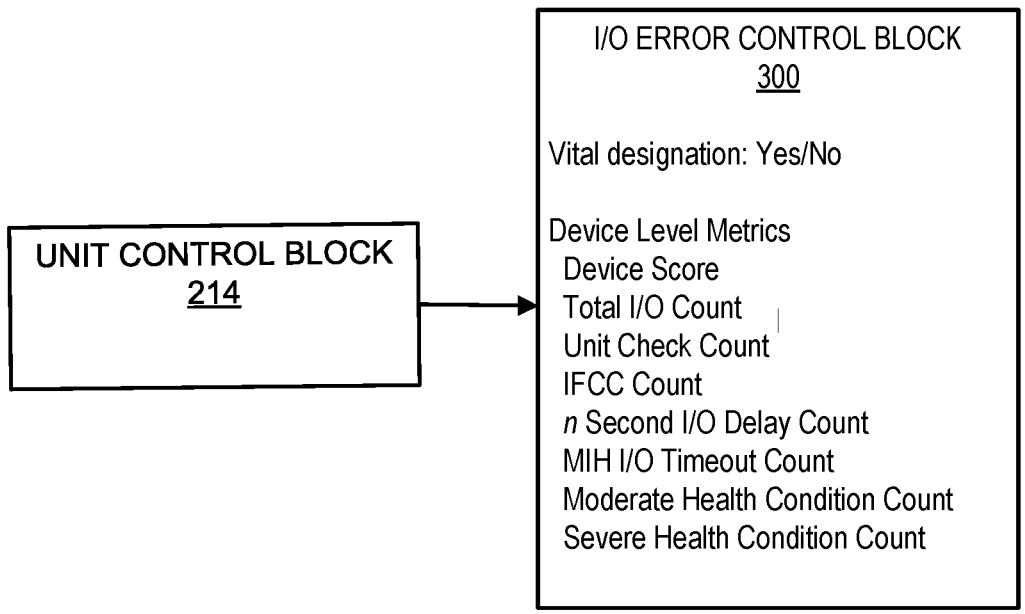
FIG. 3 sets forth a block diagram of an example unit control block according to aspects of the present disclosure.

The user control block 214 is a per device control block including an I/O error control block containing a vital or non-vital designation for the device along with device level I/O error metrics as further described with respect to an embodiment in FIG. 3. The SSID array 216 describes all copysets in the replication configuration and an importance level of the system as further described with respect to an embodiment in FIG. 4.

Referring now to FIG. 3, FIG. 3 sets forth a block diagram of an example unit control block according to aspects of the present disclosure. The unit control block 214 points to an I/O error control block 300 for a particular storage device such as first storage device. The I/O error control block 300 is a data structure containing a vital or non-vital designation for a storage device, such as first storage device 224A or second storage device 224B, along with device level I/O error metrics for the storage device 224A. In the particular embodiment illustrated in FIG. 3, the device level metrics include a device score, a total I/O count, a unit check count, an IFCC count, an n second (e.g., one second) I/O delay count, an MIH I/O timeout count, a moderate health condition count, and a severe health condition count. In particular embodiments, each of the storage devices is associated with a single user control block 214 having an I/O error control block 300. Although the embodiment illustrated in FIG. 3 shows particular device level metrics for a storage device, in other embodiments other suitable device level metrics can be used to describe I/O errors occurring for the storage device.

Figure 4:
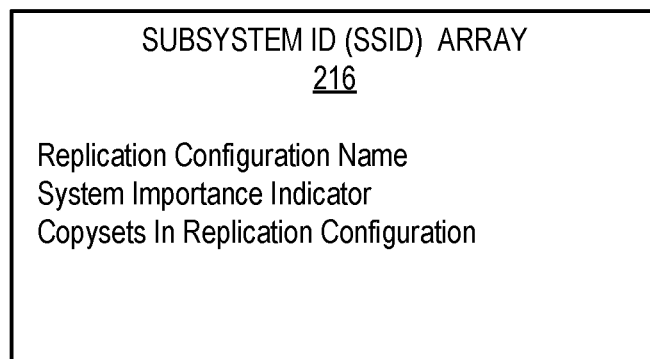
FIG. 4 sets forth a block diagram of an example subsystem identifier array according to aspects of the present disclosure.

Referring now to FIG. 4, FIG. 4 sets forth a block diagram of an example subsystem identifier array according to aspects of the present disclosure. The SSID array 216 is associated with a particular replication session and includes a replication configuration name, a system importance indicator indicating an importance level (e.g., vital or non-vital) for the storage system (e.g., the first storage system 220), and a description of all copysets in the replication configuration. In a particular embodiment, the system importance indicator is set as a parameter for a started swap task.

Referring now to FIG. 5, FIG. 5 sets forth a flowchart of an example process for missing interrupt handler processing according to aspects of the present disclosure. In one or more embodiments, the operations of FIG. 5 are performed by the MIH processing component 206 of the swap management module 204. MIH processing runs 500 for a storage device, and counter of times checked for the storage device is incremented 502. The MIH processing component 206 determines 504 whether the times checked are greater than a threshold value m. If the times checked are greater than the threshold value m, the MIH processing component 206 call 506 a trend processing procedure as further described herein with respect to FIG. 10, resets 508 all counters in the I/O error control block 300, and resets 510 the counter of times checked. The trend processing procedure is configured to determine a trend of device I/O errors over time, in particular, whether the trend of device I/O errors is rising over time.

If the times checked are not greater than the threshold value m, or after the counter of times checked is reset 510, the MIH processing component 206 determines 512 whether a UCBHSWAP value is set for the storage device. The UCBHSWAP value indicates whether the storage device is enabled for swap operations (e.g., HyperSwap operations). If the UCBHSWAP value is not set, the process ends 524. If the UCBHSWAP value is set, the MIH processing component 206 determines 514 whether there are any I/O requests queued for more than n seconds (e.g., one second). If there are I/O request queued for more than n seconds, the MIH processing component 206 increments 516 a count of n second delays for the storage device, evaluates 518 a swap score for the storage system to determine a risk level for an unplanned swap event and whether a swap event is to be triggered as further described with respect to FIGS. 8A-8B, and the process ends 524.

If no I/O requests are queued for more than n seconds, the MIH processing component 206 determines 520 if there is an MIH timeout for the storage device. If there is an MIH timeout for the storage device, the MIH processing component 206 increments 522 a count of MIH timeouts for the storage device, evaluates 516 a risk level for unplanned swap and swap score for the storage system to determine a risk level for an unplanned swap event and whether a swap event is to be triggered as further described with respect to FIGS. 8A-8B, and the process ends 524.

Figure 6:
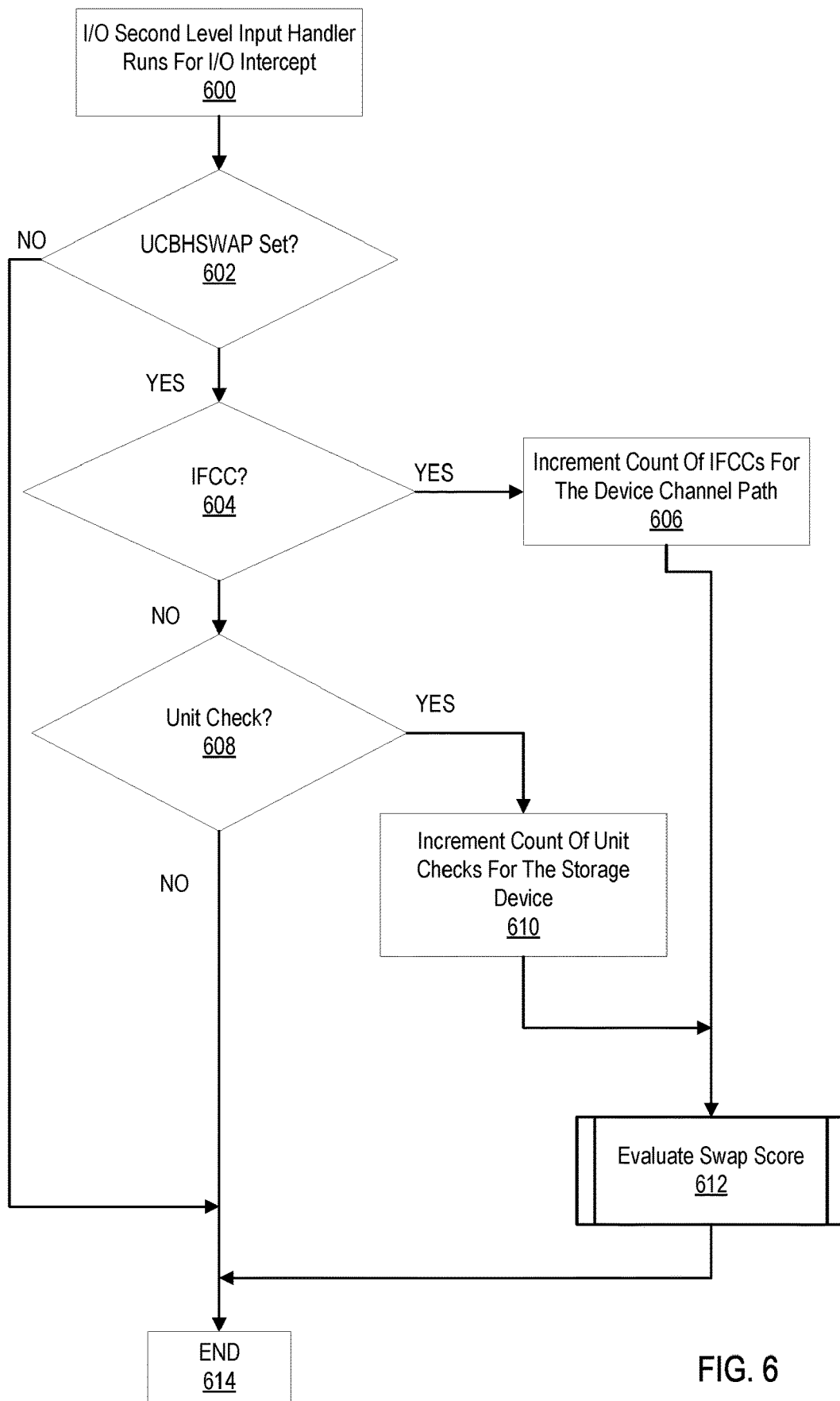
FIG. 6 sets forth a flowchart of an example process for I/O second level input handler processing according to aspects of the present disclosure.

Referring now to FIG. 6, FIG. 6 sets forth a flowchart of an example process for I/O second level input handler processing according to aspects of the present disclosure. In one or more embodiments, the operations of FIG. 6 are performed by the I/O SLIH processing component 208 of the swap management module 204. MIH processing runs 600 for I/O intercept for a storage device. I/O SLIH processing component 208 determines 602 whether the UCBHSWAP value is set for the storage device. As discussed, the UCBHSWAP value indicates whether the storage device is enabled for swap operations. If the UCBHSWAP value is not set, the process ends 614. If the UCBHSWAP value is set, the I/O SLIH processing component 208 determines 604 whether an IFCC has occurred for the storage device. As discussed, an IFCC indicates that an incorrect signal has occurred on a channel path associated with the storage device. If an IFCC has occurred, the I/O SLIH processing component 208 increments 606 a count of IFCCs for the device channel path, evaluates 612 a swap score for the storage system to determine a swap risk level and whether a swap event is to be triggered as further described with respect to FIGS. 8A-8B, and the process ends 614.

If no IFCC has occurred, the I/O SLIH processing component 208 determines 608 whether a unit check has occurred for the storage device. A unit check is an I/O error indicative of a rejected read/write command. If a unit check has occurred, the I/O SLIH processing component 208 increments 610 a count of unit checks for the storage device, evaluates 612 a swap score for the storage system to determine a swap risk level and whether a swap event is to be triggered as further described with respect to FIGS. 8A-8B, and the process ends 614. If no unit check has occurred, the process sends 614.

Figure 7:
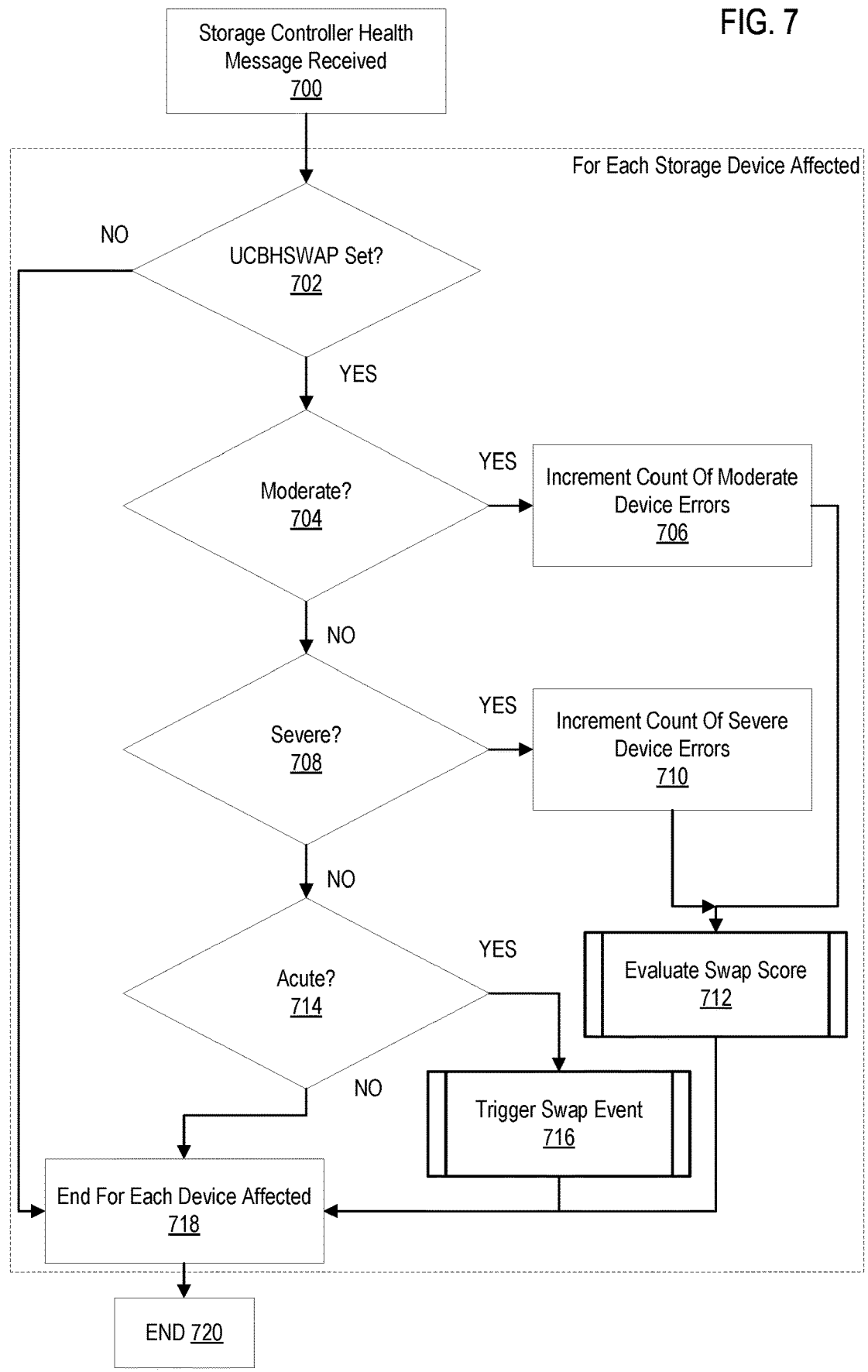
FIG. 7 sets forth a flowchart of an example process for storage control health message processing according to aspects of the present disclosure.

Referring now to FIG. 7, FIG. 7 sets forth a flowchart of an example process for storage control health message processing according to aspects of the present disclosure. In one or more embodiments, the operations of FIG. 7 are performed by the storage controller health message processing component 210 of the swap management module 204. As previously discussed, each storage system includes a storage controller in communication with one or more storage devices. A storage controller health message is received 700 by the storage controller health message processing component 210. For each affected storage device of the storage system, the storage controller health message processing component 210 determines 702 whether the UCBHSWAP value is set for the storage device. As discussed, the UCBHSWAP value indicates whether the storage device is enabled for swap operations. If the UCBHSWAP value is not set, the process ends 718 for the affected storage device. If the UCBHSWAP value is set, the storage controller health message processing component 210 determines 704 whether the storage controller health message indicates that the health of the storage device is moderate. If the health of the storage device is determined to be moderate, the storage controller health message processing component 210 increments 706 a count of moderate device errors, evaluates 712 a swap score for the storage system to determine whether a swap event is to be triggered as further described with respect to FIGS. 8A-8B, and the process ends 718 for the affected storage device.

If the health of the storage device is not determined to be moderate, the storage controller health message processing component 210 determines 708 whether the storage controller health message indicates that the health of the storage device is severe. If the health of the storage device is determined to be severe, the storage controller health message processing component 210 increments 710 a count of severe device errors, evaluates 712 a swap score for the storage system to determine whether a swap event is to be triggered as further described with respect to FIGS. 8A-8B, and the process ends 718 for the affected storage device.

If the health of the storage device is not determined to be severe, the storage controller health message processing component 210 determines 714 whether the storage controller health message indicates that the health of the storage device is acute. If the health of the storage device is determined to be acute, the storage controller health message processing component 210 triggers 716 a swap event to swap between the first storage system 220 and the second storage system 226, and the process ends 718 for the affected storage device. If the health of the storage device is not determined to be acute, the process ends 718 for the affected storage device. Once the process has ended for all affected storage devices, the process of FIG. 7 ends 720.

Figure 8A:
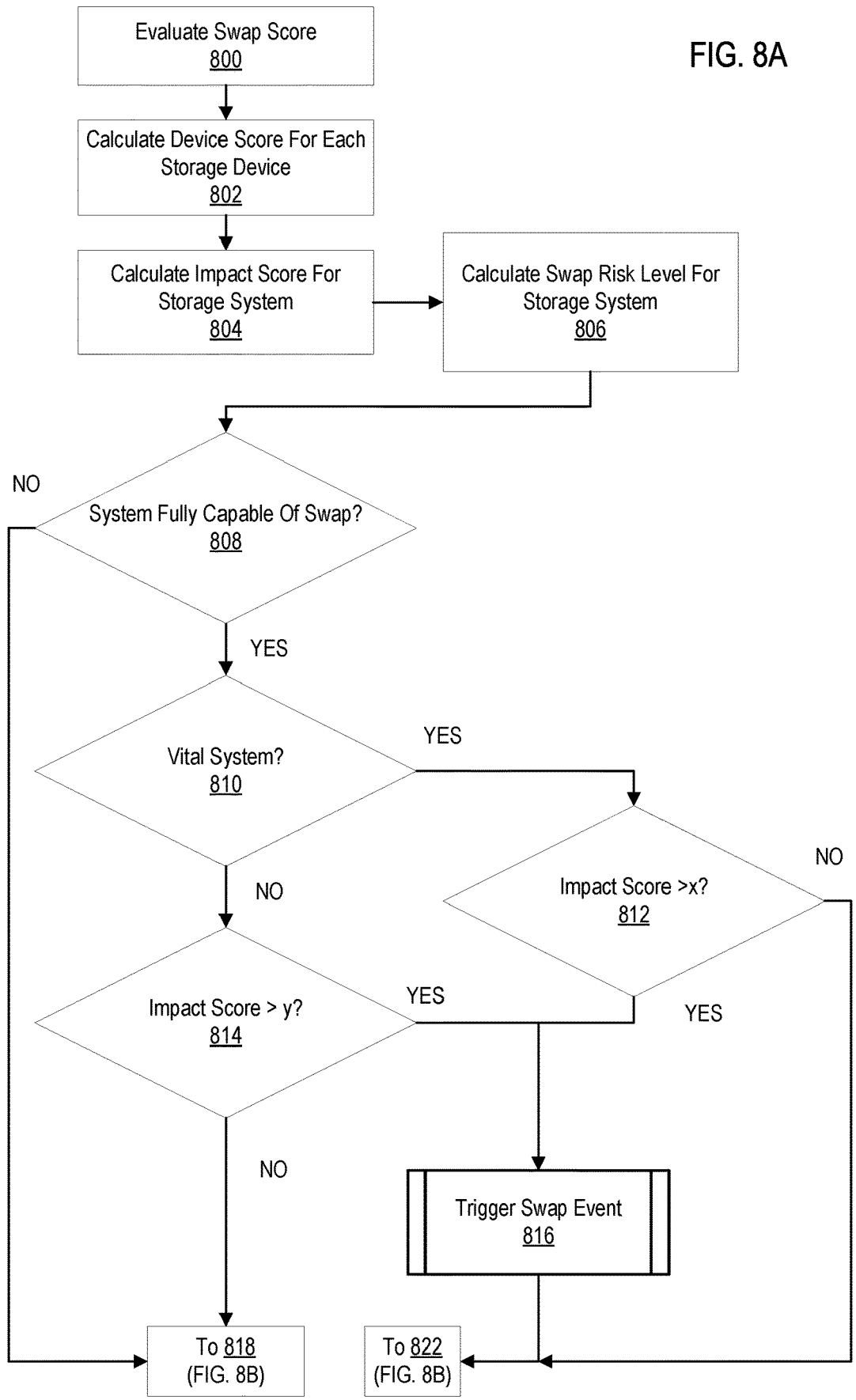
FIGS. 8A-8B set forth a flowchart of an example process for determining an unplanned swap event risk level for a storage system according to aspects of the present disclosure.
Figure 8B:
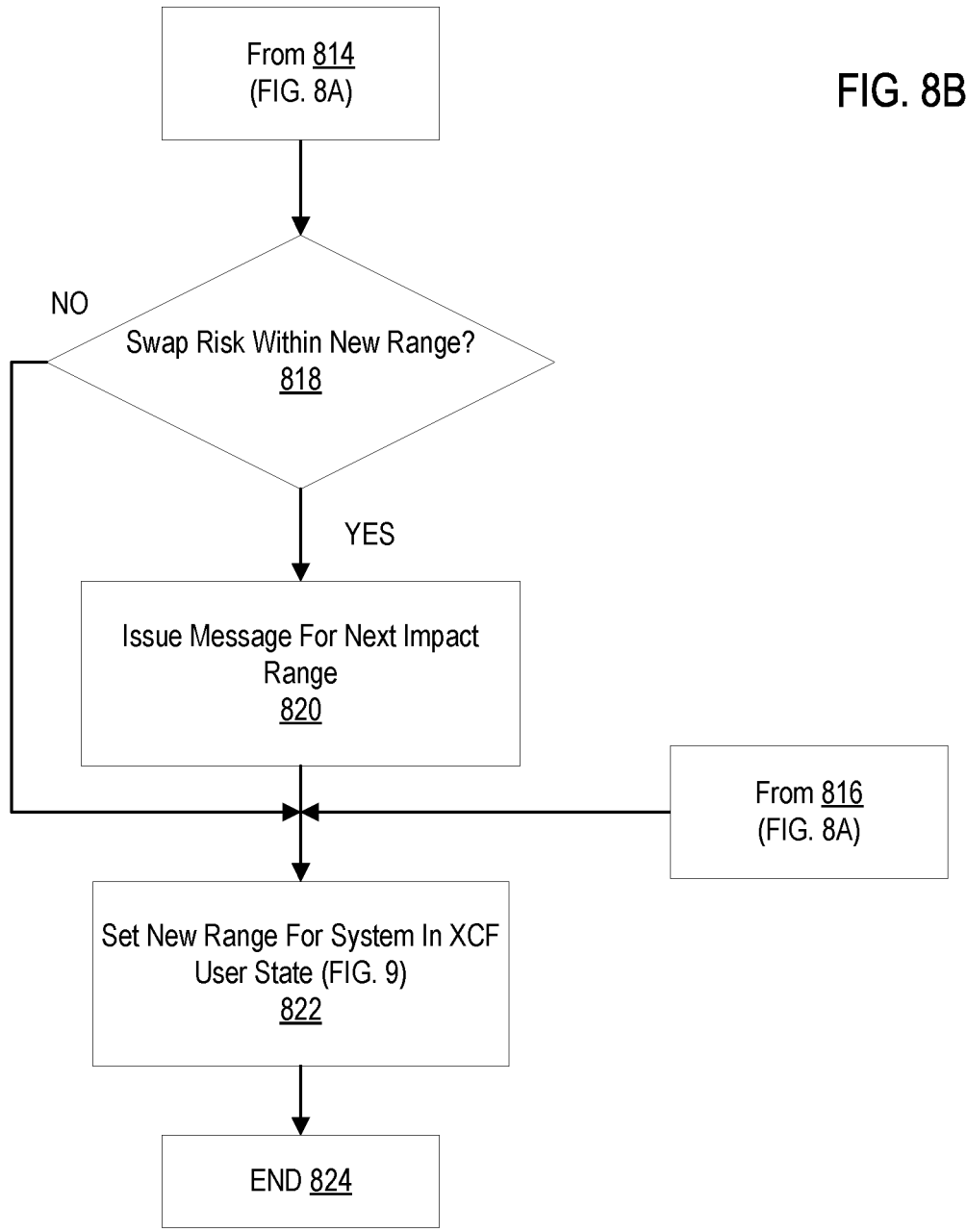

Referring now to FIGS. 8A-8B, FIGS. 8A-8B set forth a flowchart of an example process for determining an unplanned swap event risk level for a storage system according to aspects of the present disclosure. In one or more embodiments, the operations of FIGS. 8A-8B are performed by the swap score and swap risk evaluation component 212 of the swap management module 204. The swap score and swap risk evaluation component 212 initiates evaluation 800 of a swap score for a storage system. The swap score and swap risk evaluation component 212 calculates 802 a device score for each of the storage devices of the storage system. In one or more embodiments, the device score for each of the storage devices is based on a weighted sum of error counts of each of the different I/O error types detected for the storage device divided by the total I/O count in which the error counts of each of the different I/O error types is weighted by a weighting coefficient that is based on the particular I/O error type. In a particular embodiment, the device score is calculated based on a weighted sum of the unit check (UC) count, the timeout count, the MIH count, the moderate alert count, the sever alert count, and the IFCC count, each weighted by a weighting coefficient in accordance with a respective importance of the particular I/O error in the device score determination.

An example equation for computation of a device score for a storage device is as follows:

$$\text{Device Score} = \qquad \{\text{Equation 1}\}$$
$$(UC \text{ count} * 2 + \text{Timeout count} * 2 + MIH \text{ Count} * 5 +$$
$$\text{Moderate Alert count} * 4 +$$
$$\text{Severe Alert count} * 6 IFCC \text{ count} * 1) / (\text{Total } I/O \text{ count})$$

The swap score and swap risk evaluation component 212 calculates 804 an impact score for the storage system based on the device scores for each of the storage devices of the storage system and a criticality attribute of each of the storage devices. The term impact score is synonymous with the term swap score as discussed with respect to various embodiments described herein. In an embodiment, the impact score (or swap score) is based on a weighted sum of counts of device scores for nonvital storage devices above a nonvital threshold, and counts of device scores for vital storage devices above a vital threshold. In one or more embodiments, the nonvital device scores and vital device scores are weighted according to different weighting coefficients with the weighting of the vital device scores being greater than the weighting of the nonvital device scores.

An example equation for computation of an impact score (or swap score) for a storage system is as follows:

$$\text{Impact Score} = \qquad \{\text{Equation 2}\}$$
$$(\text{Count of device scores for nonvital devices}$$
$$\text{above a nonvital threshold}) + (\text{Count of device}$$
$$\text{scores for vital devices above a vital threshold}) * 10$$

The swap score and swap risk evaluation component 212 calculates 806 a swap risk level for the first storage system based on detected I/O errors for each of the storage devices and the criticality level of the first storage system. In a particular embodiment, calculating 806 the swap risk level includes calculating a first swap score value based on a ratio of a count of device scores for vital devices and a first threshold value, and calculating a second swap score value based on a ratio of a count of device scores for nonvital devise and a second threshold value, and calculating the risk level based on the swap score value comprises determining a maximum value of the first swap score value and the second swap score value.

An example equation for calculating a swap risk level is as follows:

$$\text{Swap risk} = \text{MAX} \left( (\text{Vital Impact Score/Vital threshold}), \quad \{\text{Equation 3}\} \right.$$
$$\left. (\text{Non Vital Impact Score/Non vital Threshold}) \right)$$

In one or more embodiments, a swap risk level is assigned based on a calculated swap risk falling in a particular swap score range. Examples of swap score ranges and corresponding swap risk levels is provide in Table 1 below:

| Swap Score Range | Message |
| --- | --- |
| 0 | No Swap Risk Detected |
| 1-29 | Some Swap Risk Detected |
| 30-69 | Moderate Swap Risk Detected |
| 70-99 | High Swap Risk Detected. |

The swap score and swap risk evaluation component 212 determines 808 whether the storage system is fully capable of swap operations. If the storage system is not fully capable of swap operations, the process of FIGS. 8A-8B proceeds to 818. If the storage system is fully capable of swap operations, the swap score and swap risk evaluation component 212 determines 810 whether the storage system is a vital system. If the storage system is determined to be a vital system, the swap score and swap risk evaluation component 212 determines 812 whether the impact score is greater than a first threshold value x. If the impact score is determined to be greater than the first threshold value x, the swap score and swap risk evaluation component 212 triggers 816 a swap event to swap between the first storage system 220 and the second storage system 226, and the process continues to 822.

If the storage system is not determined to be a vital system, the swap score and swap risk evaluation component 212 determines 814 whether the impact score is greater than a second threshold value y. If the impact score is not determined to be greater than the second threshold value y, the process continues to 818. If the impact score is determined to be greater than the second threshold value y, the swap score and swap risk evaluation component 212 triggers 816 a swap event to swap between the first storage system 220 and the second storage system 226, and the process continues to 822. In particular embodiments, different threshold values are used for vital systems vs. non-vital systems such that the swap score evaluation is less sensitive to errors on non-vital systems and more sensitive to errors on vital systems.

The swap score and swap risk evaluation component 212 determines 818 whether the determined swap risk level is within a new range. If the swap score and swap risk evaluation component 212 determines that the swap risk level is within a new range, the swap score and swap risk evaluation component 212 issues 820 a message indicative of the new impact range. If the swap risk level is not within a new range or after issuing the message for the next impact range, the swap score and swap risk evaluation component 212 sets a new range for the system in a cross system coupling facility (XCF) user state as further described with respect to FIG. 9. The procedure of FIG. **8A-\*B ends 824**.

Figure 9:
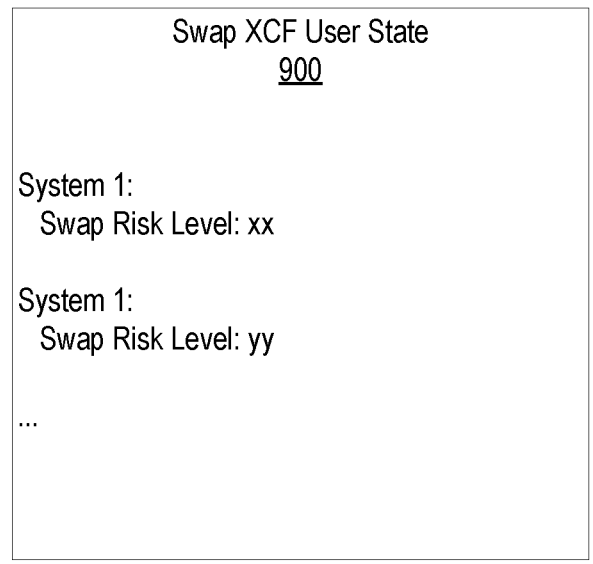
FIG. 9 sets forth a block diagram of an example cross system coupling facility (XCF) user state according to aspects of the present invention.

Referring now to FIG. 9, FIG. 9 sets forth a block diagram of an example cross system coupling facility (XCF) user state according to aspects of the present invention. A cross system coupling facility (XCF) user state is used to manage communication between applications in a sysplex and is used to track swap status across the sysplex. The example XCF user state 900 contains a swap risk level for each system in the sysplex. For example, a system 1 has a calculated risk level of xx, and system 2 has a calculated risk level of yy.

Figure 10:
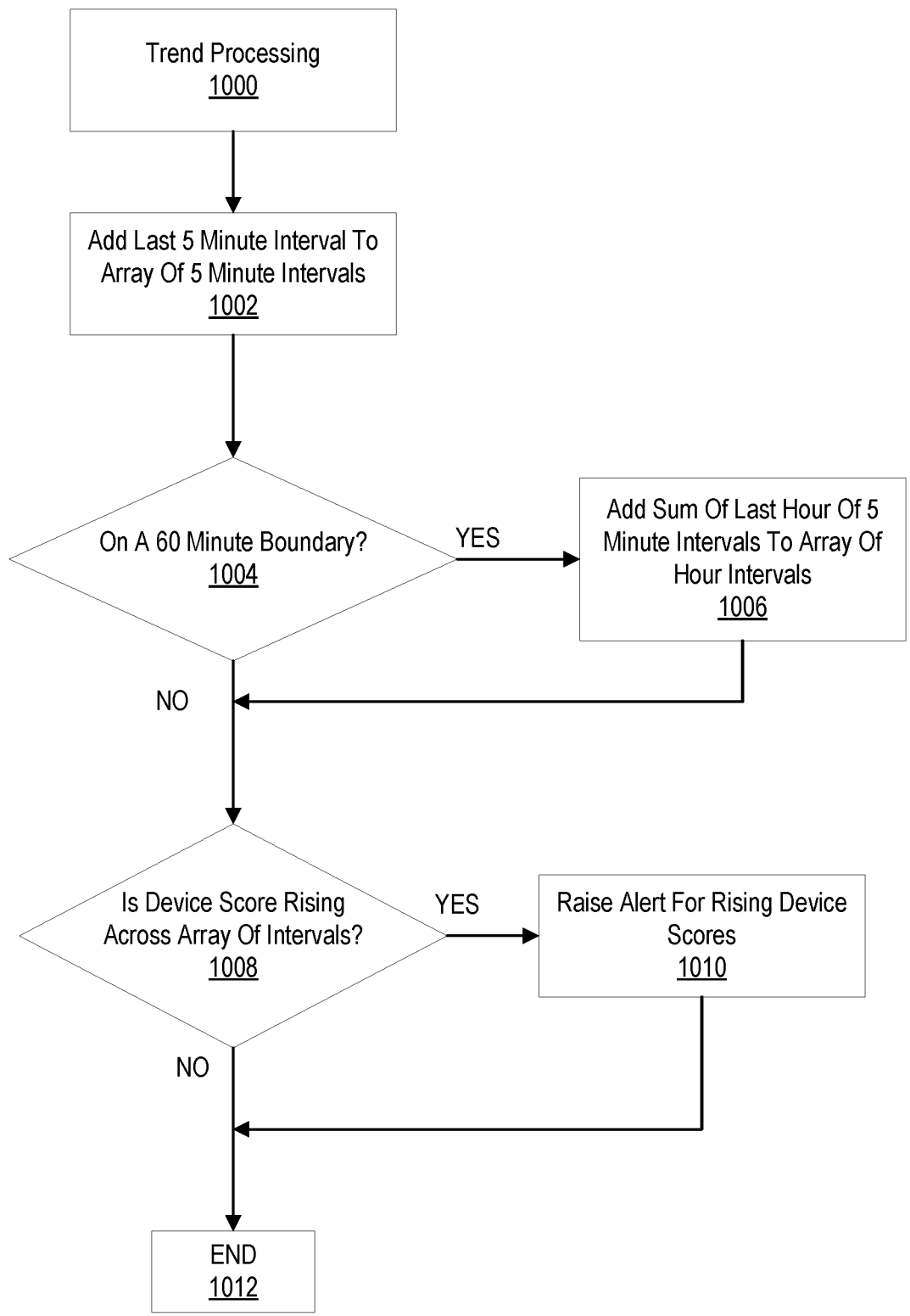
FIG. 10 sets forth a flowchart of an example process for trend processing according to aspects of the present disclosure.

Referring now to FIG. 10, sets forth a flowchart of an example process for trend processing according to aspects of the present disclosure. The swap management module 204 initiates trend processing 1000. The swap management module 204 adds 1002 the last 5 minute interval of I/O errors to an array of 5 minute intervals. The swap management module 204 determines 1004 whether the current time interval is on a 60 minute boundary. If the current time interval is on a 60 minute boundary, the swap management module 204 adds 1006 the sum of the last hour of 5 minute intervals to an array of hour intervals. The swap management module 204 determines 1008 if a device score is rising across the array of intervals. If the device score is rising over the array of intervals, the swap management module 204 raises 1010 an alert for the rising device scores. The procedure then ends 1012.

Figures 11, 12:
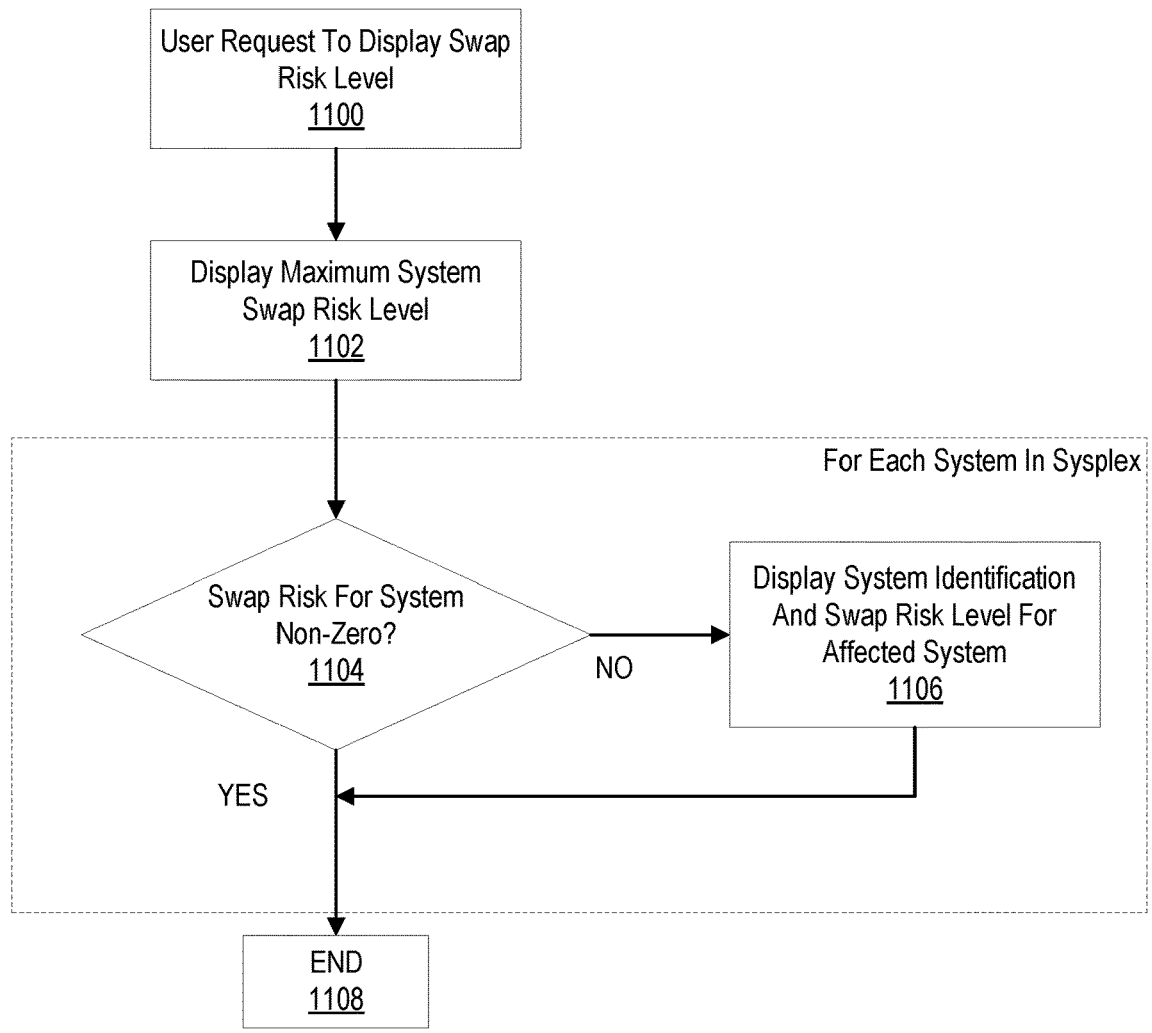
FIG. 11 sets forth a flowchart of an example process for displaying swap risk according to aspects of the present disclosure.
FIG. 12 sets forth an example swap risk display according to aspects of the present disclosure.

Referring now to FIG. 11, FIG. 11 sets forth a flowchart of an example process for displaying swap risk according to aspects of the present disclosure. The swap management module 204 receives 1100 a user request to display the swap risk level. The swap management module 204 displays 1102 the maximum system swap risk level. For each system in a sysplex, the swap management module 204 determines 1104 whether the swap risk for the system is non-zero. If the swap risk for the system is not non-zero, the swap management system displays 1106 a system identification and associated swap risk level for the affected system. The procedure then ends 1108.

Referring now to FIG. 12, FIG. 12 sets forth an example swap risk display according to aspects of the present disclosure. The swap risk display example 1200 displays a number of configurations for the sysplex, a replication session name, whether HyperSwap is enabled for the sysplex, an overall swap risk level ("High Swap Risk Detected"), a swap risk level for a system SYS1 ("Low Swap Risk Detected"), and a swap risk level for a system SYS2 ("High Swap Risk Detected").

Figure 13:
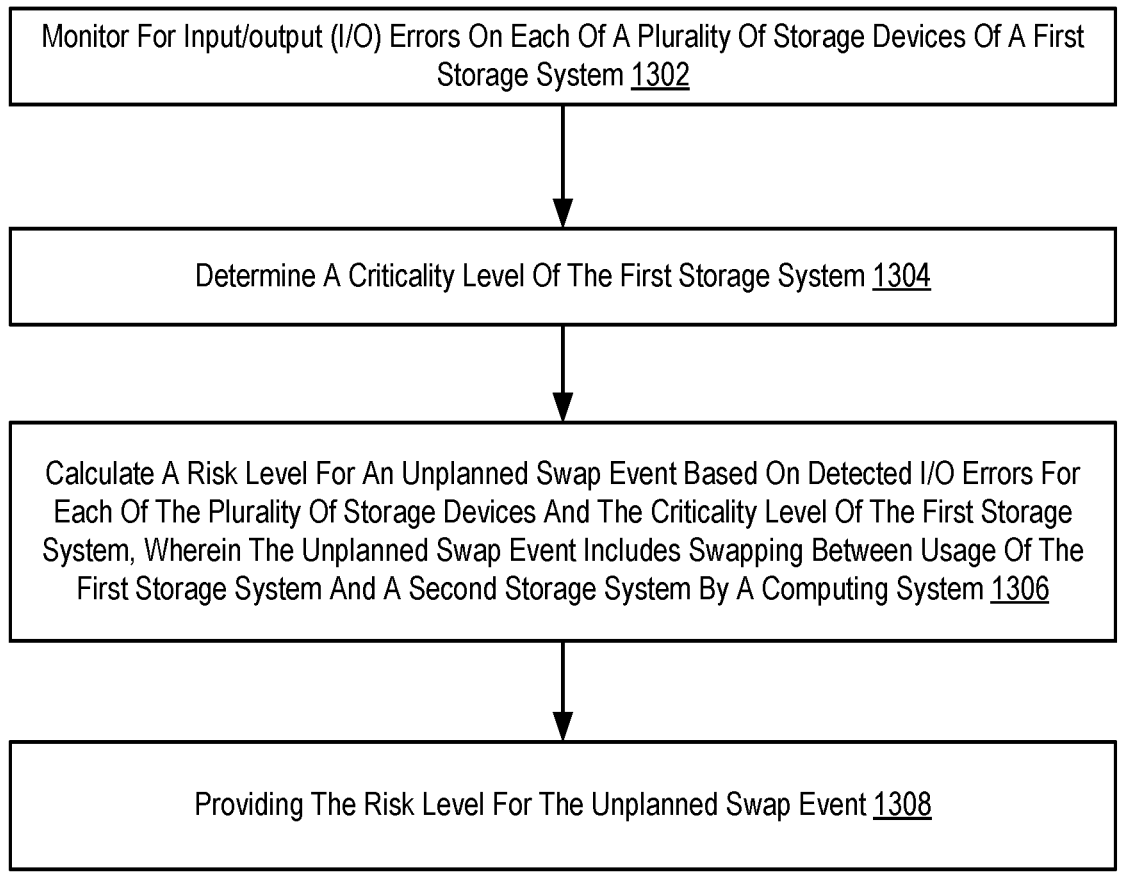
FIG. 13 sets forth a flowchart of another example process for determining an unplanned swap event risk level for a storage system according to aspects of the present disclosure.

Referring now to FIG. 13, FIG. 13 sets forth a flowchart of another example process for determining an unplanned swap event risk level for a storage system according to aspects of the present disclosure. The swap management module 204 monitors 1302 for input/output (I/O) errors on each of a plurality of storage devices of a first storage system within a predetermined time interval. The swap management module 204 determines 1304 a criticality level of the first storage system.

The swap management module 204 calculates 1306 a risk level for an unplanned swap event based on detected I/O errors for each of the plurality of storage devices and the criticality level of the first storage system. In an embodiment, the unplanned swap event includes swapping between usage of the first storage system and a second storage system by a computing system. In an embodiment, calculating the risk level for the unplanned swap event further includes determining a criticality attribute of each of the plurality of storage devices, calculating a device score for each of the plurality of storage devices based on a number of I/O errors detected for the storage device, calculating a swap score value for the first storage system based on the criticality attribute of each of the plurality of storage devices and the device score for each of the plurality of storage devices, and calculating the risk level based on the swap score value.

In a particular embodiment, calculating the device score for each of the plurality of storage devices based on the number of I/O errors detected for the storage device includes calculating the device score based on a weighted sum of a plurality of different I/O error types of the number of I/O errors detected for the storage device. In a particular embodiment, each of the different I/O error types is weighted by a weighting coefficient based on a particular I/O error type.

In another embodiment, calculating the swap score value for the first storage system includes calculating a first sum of device scores for a first set of the plurality of storage devices, each storage device of the first set of the plurality of storage devices having a first criticality attribute, calculating a second sum of device scores for a second set of the plurality of storage devices, each storage device of the second set of the plurality of storage devices having a second criticality attribute, and calculating the swap score based on a sum of the first sum weighted by a first weighting coefficient and the second sum weighted by second weighting coefficient. In a particular embodiment, each of the first set of the plurality of storage devices further having a device score above a first error threshold value, and each of the second set of the plurality of storage devices having a device score above a second error threshold value.

In another embodiment, a first swap score value is calculated based on a ratio of a count of device scores for vital devices and a first threshold value, and a second swap score value is calculated based on a ratio of a count of device scores for nonvital devise and a second threshold value. In the embodiment, calculating the risk level based on the swap score value includes determining a maximum value of the first swap score value and the second swap score value.

In another embodiment, the swap management module 204 determines a trend of device scores occurring within predetermined time interval, determines that the trend of device scores is rising during the predetermined time interval, and provides an alert indicative of the rising device scores.

The swap management module 204 provides 1308 the risk level for the unplanned swap event. In an embodiment, providing the risk level for the unplanned swap event further includes displaying the risk level for the unplanned swap event to a user. In another embodiment, providing the risk level for the unplanned swap event further includes sending a message indicative of the risk level to an operating system of the computing system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   monitoring for input/output (I/O) errors on each of a plurality of storage devices of a first storage system within a predetermined time interval;
   determining a criticality level of the first storage system;
   calculating a risk level for an unplanned swap event based on detected I/O errors for each of the plurality of storage devices and the criticality level of the first storage system, wherein the unplanned swap event includes swapping between usage of the first storage system and a second storage system by a computing system, and wherein calculating the risk level includes:
      calculating a swap score value for the first storage system based on a criticality attribute of each of the plurality of storage devices and a device score, based on a number of I/O errors detected for the storage device, for each of the plurality of storage devices; and
      calculating the risk level based on the swap score value;
   providing the risk level for the unplanned swap event; and
   triggering, based on the risk level, the unplanned swap event, including swapping between usage of the first storage system and the second storage system by the computing system.

2. The method of claim 1, wherein calculating the risk level for the unplanned swap event further comprises:
   determining the criticality attribute of each of the plurality of storage devices; and
   calculating the device score for each of the plurality of storage devices based on the number of I/O errors detected for the storage device.

3. The method of claim 2, wherein calculating the device score for each of the plurality of storage devices based on the number of I/O errors detected for the storage device comprises calculating the device score based on a weighted sum of a plurality of different I/O error types of the number of I/O errors detected for the storage device.

4. The method of claim 3, wherein each of the different I/O error types is weighted by a weighting coefficient based on a particular I/O error type.

5. The method of claim 2, wherein calculating the swap score value for the first storage system further comprises:
   calculating a first sum of device scores for a first set of the plurality of storage devices, each storage device of the first set of the plurality of storage devices having a first criticality attribute;
   calculating a second sum of device scores for a second set of the plurality of storage devices, each storage device of the second set of the plurality of storage devices having a second criticality attribute; and
   calculating the swap score based on a sum of the first sum weighted by a first weighting coefficient and the second sum weighted by second weighting coefficient.

6. The method of claim 5, wherein each of the first set of the plurality of storage devices further having a device score above a first error threshold value, and each of the second set of the plurality of storage devices having a device score above a second error threshold value.

7. The method of claim 1, further comprising:
   calculating a first swap score value based on a ratio of a count of device scores for vital devices and a first threshold value; and
   calculating a second swap score value based on a ratio of a count of device scores for nonvital devices and a second threshold value.

8. The method of claim 7, wherein calculating the risk level based on the swap score value comprises determining a maximum value of the first swap score value and the second swap score value.

9. The method of claim 1, further comprising:
determining a trend of device scores occurring within predetermined time interval;
determining that the trend of device scores is rising during the predetermined time interval; and
providing an alert indicative of the rising device scores.

10. The method of claim 1, wherein providing the risk level for the unplanned swap event further comprises displaying the risk level for the unplanned swap event to a user.

11. The method of claim 1, wherein providing the risk level for the unplanned swap event further comprising sending a message indicative of the risk level to an operating system of the computing system.

12. An apparatus comprising:
a processing device; and
memory operatively coupled to the processing device, wherein the memory stores computer program instructions that, when executed, cause the processing device to:
monitor for input/output (I/O) errors on each of a plurality of storage devices of a first storage system within a predetermined time interval;
determine a criticality level of the first storage system;
calculate a risk level for an unplanned swap event based on detected I/O errors for each of the plurality of storage devices and the criticality level of the first storage system, wherein the unplanned swap event includes swapping between usage of the first storage system and a second storage system by a computing system, and wherein calculating the risk level includes:
calculating a swap score value for the first storage system based on a criticality attribute of each of the plurality of storage devices and a device score, based on a number of I/O errors detected for the storage device, for each of the plurality of storage devices; and
calculating the risk level based on the swap score value;
provide the risk level for the unplanned swap event; and
trigger, based on the risk level, the unplanned swap event, including swapping between usage of the first storage system and the second storage system by the computing system.

13. The apparatus of claim 12, wherein calculating the risk level for the unplanned swap event further comprises:
determining the criticality attribute of each of the plurality of storage devices; and
calculating the device score for each of the plurality of storage devices based on the number of I/O errors detected for the storage device.

14. The apparatus of claim 13, wherein calculating the swap score value for the first storage system further comprises:
calculating a first sum of device scores for a first set of the plurality of storage devices, each storage device of the first set of the plurality of storage devices having a first criticality attribute;
calculating a second sum of device scores for a second set of the plurality of storage devices, each storage device of the second set of the plurality of storage devices having a second criticality attribute; and
calculating the swap score based on a sum of the first sum weighted by a first weighting coefficient and the second sum weighted by second weighting coefficient.

15. The apparatus of claim 12, the computer program instructions that, when executed, cause the processing device to:
calculate a first swap score value based on a ratio of a count of device scores for vital devices and a first threshold value; and
calculate a second swap score value based on a ratio of a count of device scores for nonvital devices and a second threshold value.

16. The apparatus of claim 15, wherein calculating the risk level based on the swap score value comprises determining a maximum value of the first swap score value and the second swap score value.

17. A computer program product comprising a computer readable storage medium, wherein the computer readable storage medium comprises computer program instructions that, when executed:
monitor for input/output (I/O) errors on each of a plurality of storage devices of a first storage system within a predetermined time interval;
determine a criticality level of the first storage system;
calculate a risk level for an unplanned swap event based on detected I/O errors for each of the plurality of storage devices and the criticality level of the first storage system, wherein the unplanned swap event includes swapping between usage of the first storage system and a second storage system by a computing system, and wherein calculating the risk level includes:
calculating a swap score value for the first storage system based on a criticality attribute of each of the plurality of storage devices and a device score, based on a number of I/O errors detected for the storage device, for each of the plurality of storage devices; and
calculating the risk level based on the swap score value;
provide the risk level for the unplanned swap event; and
trigger, based on the risk level, the unplanned swap event, including swapping between usage of the first storage system and the second storage system by the computing system.

18. The computer program product of claim 17, wherein the computer program instructions, when executed:
calculate a first sum of device scores for a first set of the plurality of storage devices, each storage device of the first set of the plurality of storage devices having a first criticality attribute;
calculate a second sum of device scores for a second set of the plurality of storage devices, each storage device of the second set of the plurality of storage devices having a second criticality attribute; and
calculate a swap score based on a sum of the first sum weighted by a first weighting coefficient and the second sum weighted by second weighting coefficient.

19. The computer program product of claim 17, wherein the computer program instructions that, when executed:
calculate a first swap score value based on a ratio of a count of device scores for vital devices and a first threshold value; and
calculate a second swap score value based on a ratio of a count of device scores for nonvital devices and a second threshold value.

20. The computer program product of claim 19, wherein calculating the risk level comprises determining a maximum value of the first swap score value and the second swap score value.

* * * * *